(12) United States Patent
Budike (10) Patent No.: US 7,637,628 B2
(45) Date of Patent: Dec. 29, 2009

(54) LED LIGHT POD WITH MODULAR OPTICS AND HEAT DISSIPATION STRUCTURE

(75) Inventor: Lothar E. S. Budike, Villanova, PA (US)

(73) Assignee: Light-Pod, Inc., Villanova, PA (US)

( * ) Notice: Subject to any disclaimer, the term of this patent is extended or adjusted under 35 U.S.C. 154(b) by 0 days.

(21) Appl. No.: 11/808,913

(22) Filed: Jun. 13, 2007

(65) Prior Publication Data

US 2008/0055900 A1 Mar. 6, 2008

Related U.S. Application Data

(60) Provisional application No. 60/813,004, filed on Jun. 13, 2006.

(51) Int. Cl.
*F21V 7/00* (2006.01)
(52) U.S. Cl. ........................ 362/247; 362/294; 362/373; 362/241; 362/249; 362/237; 362/240; 362/243; 362/307; 362/800; 362/218
(58) Field of Classification Search .................. None
See application file for complete search history.

(56) References Cited

U.S. PATENT DOCUMENTS

| | | | | |
|---|---|---|---|---|
| 2,295,863 A | * | 9/1942 | Paradis | ........................ 362/227 |
| 3,162,500 A | * | 12/1964 | Pittman | ........................ 439/45 |
| 5,660,461 A | * | 8/1997 | Ignatius et al. | .............. 362/241 |
| 6,045,240 A | * | 4/2000 | Hochstein | .................... 362/294 |
| 6,367,949 B1 | * | 4/2002 | Pederson | .................... 362/240 |
| 6,371,636 B1 | * | 4/2002 | Wesson | ....................... 362/545 |
| 2002/0148595 A1 | * | 10/2002 | Sato et al. | ................... 165/80.1 |
| 2003/0189829 A1 | * | 10/2003 | Shimizu et al. | ............. 362/240 |
| 2004/0149998 A1 | * | 8/2004 | Henson et al. | ................ 257/98 |
| 2005/0083713 A1 | * | 4/2005 | Boks | ......................... 362/561 |
| 2005/0247947 A1 | * | 11/2005 | Owen et al. | ................... 257/89 |
| 2006/0002148 A1 | * | 1/2006 | Kim et al. | .................... 362/615 |

* cited by examiner

*Primary Examiner*—Sandra L O'Shea
*Assistant Examiner*—Danielle Allen
(74) *Attorney, Agent, or Firm*—McKenna Long & Aldridge LLP (57) ABSTRACT

Disclosed is a modular light emitting diode (LED) light pod having heat dissipation structures. A reflective optic plate, which may be made in various modular sizes and designs, having a plurality of recesses is seated on an LED board having a plurality of LEDs, such that the plurality of LEDs fit within the plurality optical recesses. The optical recesses serve to collimate light in a desirable manner based on pre-determined dimensional ratios of the optical recesses. A heat dissipation system involves a heat sink housing acting in combination with a heat extraction plate having a plurality thermally conductive posts extending perpendicularly from a top and bottom surface, and a heat dissipation plate to create a thermally conductive path for moving heat away from the LED board when the light pod is in use.

10 Claims, 9 Drawing Sheets

LED LIGHT POD WITH MODULAR OPTICS AND HEAT DISSIPATION STRUCTURE

This application claims the benefit of U.S. Provisional Patent Application No. 60/813,004, filed on Jun. 13, 2006, which is hereby incorporated by reference for all purposes as if fully set forth herein.

BACKGROUND OF THE INVENTION

1. Field of the Invention

The disclosure generally relates to LED light fixtures. More particularly, the disclosure relates to modular LED light fixtures having light diffusion control structures and heat dissipation structures.

2. Discussion of the Related Art

There are various types of lighting sources available on the market today. The most common of these are incandescent or florescent lamps.

These related art light sources have the major disadvantages of inefficiency, short lamp life, and poor durability. Incandescent lamps and other related art lamps are highly inefficient when compared to other light sources, converting the applied energy mostly into heat rather than light. Regarding lamp life, incandescent lamps rank lowest, with a lamp life that may range from 750 hours to approximately 5,000 hours. The lamp life of florescent lamps is somewhat better, at approximately 20,000 hours. Another disadvantage is that incandescent and florescent lamps are easily breakable.

Light emitting diodes (LEDs), also known as solid-state lighting, have entered the market in recent years and offer solutions to some of the above disadvantages. LEDs use a semiconductor chip doped with impurities to emit a type of electroluminescence. Generally, an LED is connected to a driver circuit. As the driver circuit applies a voltage to the chip, the LED produces a narrow spectrum light. LEDs are much less susceptible to breaking compared to incandescent and florescent lamps. LEDs are efficient in that they produce more lumens per watt than most related art lamps. Further, LEDs generally have long lamp life, averaging at 50,000 hours, with some LEDs reaching well over 100,000 hours.

Related Art LED fixtures, however, have the disadvantage that they are costly to manufacture. This is largely a result of the fact that LEDs produce light having an angular structure. In order to make the LED produce diffused uniform light several additional optical components are needed. Further, current lighting manufacturing for general illumination are tooled for incandescent and fluorescent fixtures, not LED fixtures. Retooling would be a very costly capital investment.

Related art LED light fixtures employ multiple individual LEDs in each fixture in order to achieve a desired luminescence. Each LED within the fixture thus requires the use of a reflector lens and a secondary lens in order to effectively disperse the narrow light beam into a usable form, which may be very expensive. When multiplied by the plurality of LEDs that are used in each related art LED light fixture, manufacturing costs substantially increase, resulting in a retail cost that may deter consumers from choosing LEDs as their primary light source.

Further, related art LED light fixtures have the disadvantage in that they do not employ effective thermal management, and thus fail to properly dissipate heat that is produced. While LEDs produce more lumens per watt than other light sources, related art LED light fixture are still susceptible to burnout due to improper heat dissipation within the fixtures. Lack of proper thermal management of an LED light fixture could negatively affect light output and shorten the otherwise long and reliable life of the LEDs.

Accordingly, what is needed is a durable LED lighting system having optics that are relatively inexpensive to manufacture in various shapes and sizes, and are ease to install. What is further needed is an LED light system that provides proper thermal management of the light fixture when in use.

SUMMARY OF THE INVENTION

The disclosure provides a modular LED light pod with a heat dissipation structure that obviates one or more of the aforementioned problems due to the limitations of the related art.

Accordingly, one advantage of the invention that it reduces the costs of manufacturing an LED light fixture.

Another advantage of the invention is that it substantially mitigates the need for a separate reflector lens and secondary lens by providing a one-piece reflective optic plate. The one-piece reflective optic plate is modular, such that it may be custom made to suit design constraints.

Another advantage of the invention is that it more efficiently dissipates heat from an LED light fixture.

Another advantage of the invention is that it improves the thermal management of an LED light fixture.

Yet another advantage of the invention is that it improves LED lamp life.

Additional advantages of the invention will be set forth in the description that follows, and in part will be apparent from the description, or may be learned by practice of the invention. The advantages of the invention will be realized and attained by the structure pointed out in the written description and claims hereof as well as the appended drawings.

To achieve these and other advantages, the disclosure involves a light fixture, comprising a housing, a plurality of light sources disposed on an electrical board; a reflective optical plate disposed on the electrical board, the reflective optical plate having a plurality of recesses, wherein the plurality of recesses correspond to each of the plurality of light sources, and a heat dissipation component.

In another aspect of the disclosure, the aforementioned and other advantages are achieved by a reflective optical plate comprising a face plate, and at least one optical recess formed in the face plate, wherein the at least one optical recess has an upper aperture and a lower aperture, the lower aperture provided for receiving a light source, and wherein an inner surface of the optical recess is configured to bend light produced by the light source into a predetermined pattern.

In yet another aspect of the disclosure, the aforementioned and other advantages are achieved by a method of making a reflective optical plate, comprising, fabricating a mold for making the optical plate having predetermined dimensions which will produce a particular optical pattern, heating a metallized plastic to a liquid state, introducing the heated liquid metallized plastic into the mold and removing the metallized plastic after it has cooled.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the disclosure.

DETAILED DESCRIPTION OF THE ILLUSTRATED EMBODIMENTS

Figure 1A:
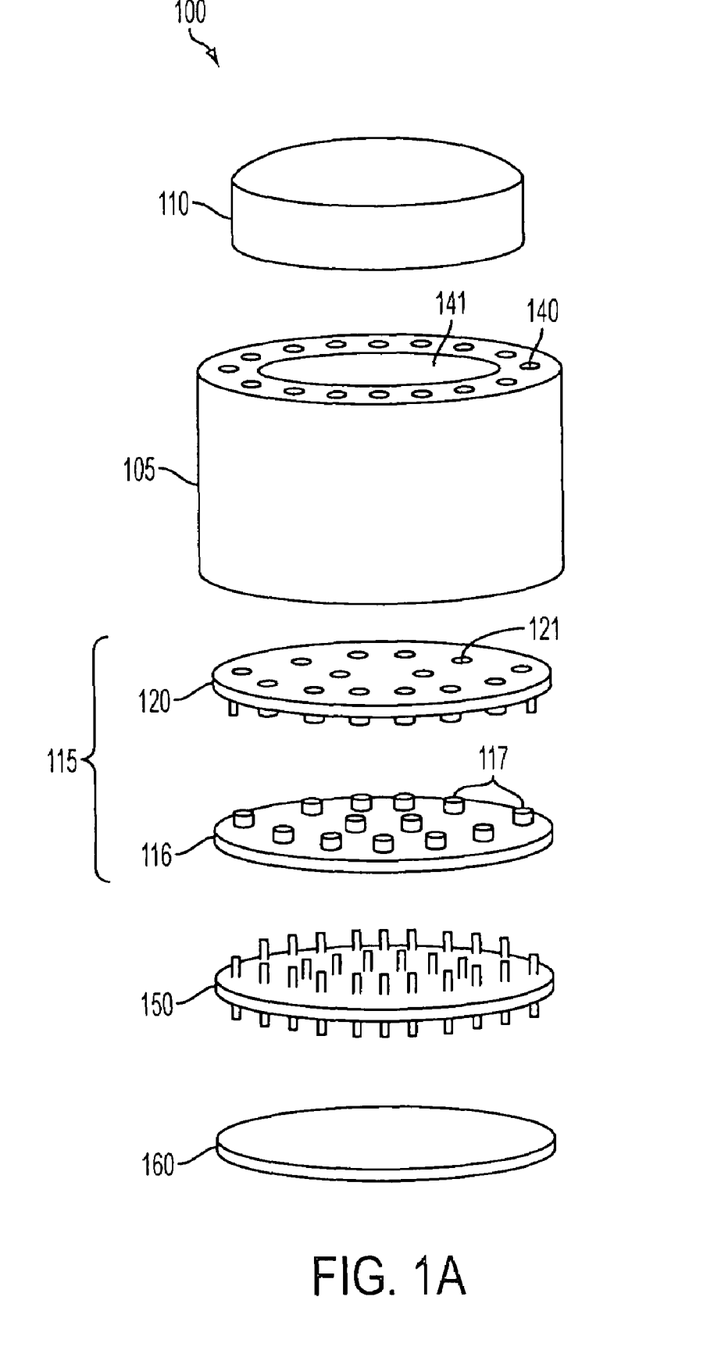
FIG. 1A illustrates an exploded view of an exemplary light pod according to the disclosure.
Figure 1B:
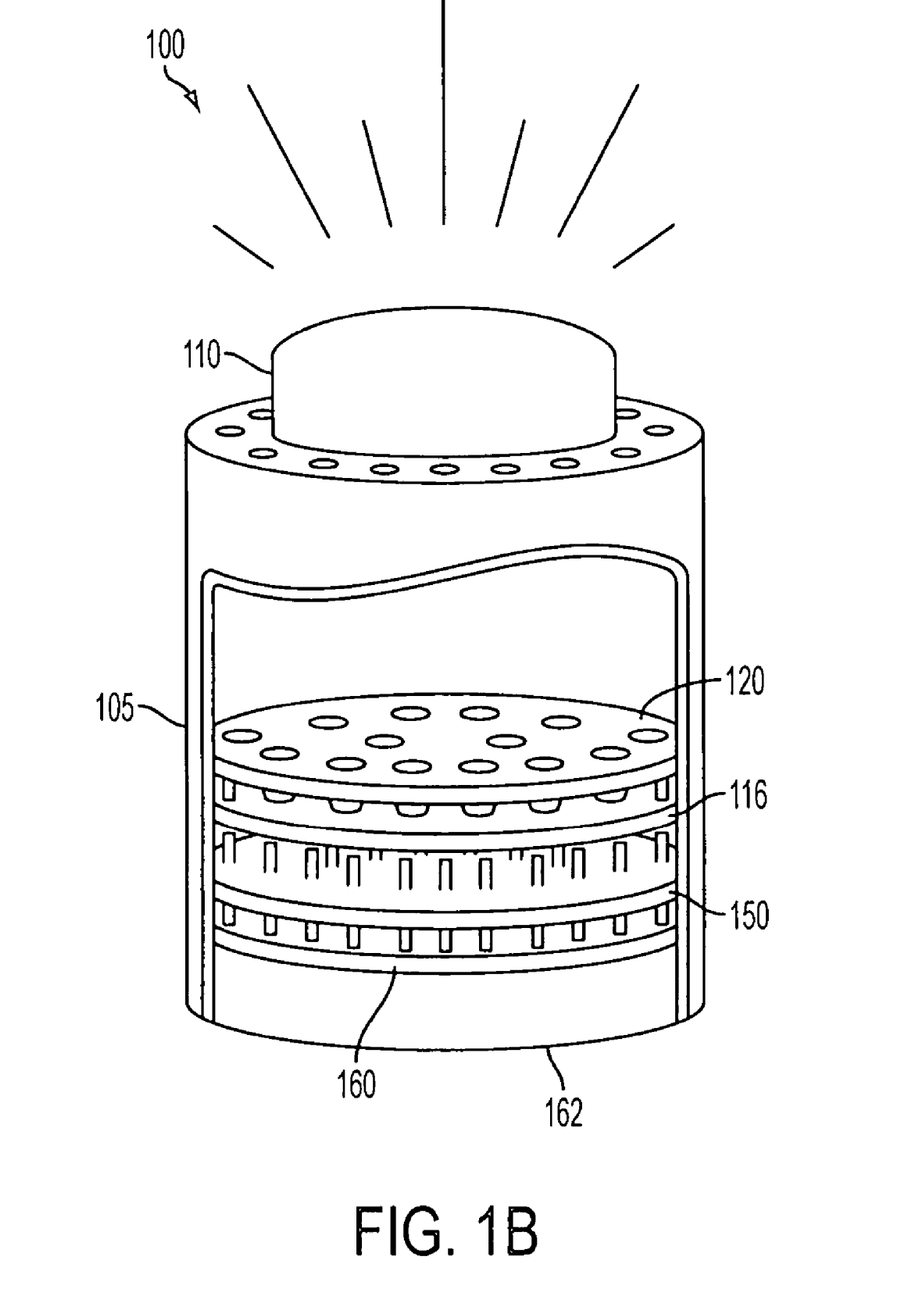
FIG. 1B illustrates a cut away view of the exemplary light pod of FIG. 1A in assembled form.

FIGS. 1A and 1B illustrate an exemplary light pod 100 according to the disclosure. Light pod 100 includes a heat sink housing 105 and a diffuser cap 110 for containing and protecting an LED light structure 115. Light structure 115 includes a plurality of LEDs 117, which may be installed on LED board 116 and fitted at a top surface with a reflective optical plate 120. Plurality of LEDs 117 collectively provide a single light source, which emits through diffuser cap 110. Light pod 100 may also include a heat extraction plate 150 having thermally conductive posts 155 extending from a surface thereof, and a heat dissipation plate 160 disposed at a bottom surface of heat extraction plate 150. One having skill in the art will appreciate that LEDs 117 may be any other type of applicable light source without departing from the spirit or scope of the disclosure.

FIG. 1B illustrates the light pod 100 in assembled form. Light pod 100 may be mounted to a wall, ceiling, or other surface by means known in the art, such as a mounting bracket or any type of fastener system that would safely hold the fixture in place. Light pod 100 may also be retrofit to function with pre-existing light fixtures or power receptacles. Each of the above components may be stacked within heat sink housing 105 in the order as illustrated in FIG. 1B, and a bottom cover 162 may be optionally placed to protect an enclosure 141 defined by heat sink housing 105.

LED board 116 may be designed based on the needs of the user and may be made of a size suitable to accommodate as many LEDs 117 as would be desirable. Further, LED board 116 may be manufactured in various shapes, such as a circle, square, triangle, hexagon, etc. The size and shape may vary in order to accommodate the design needs of a particular application, whether it be a functional, aesthetic, or any other design consideration.

Figure 2A:
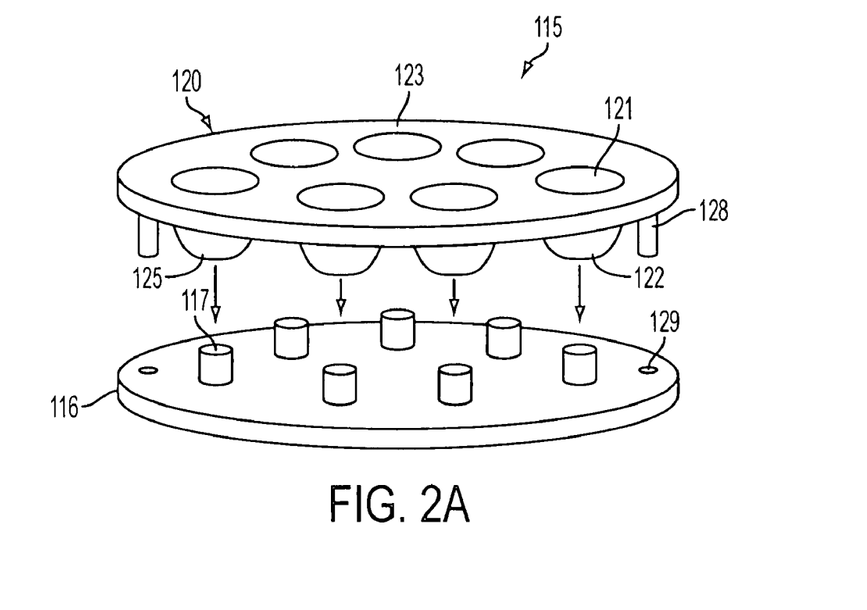
FIG. 2A illustrates an exploded view of an exemplary light structure.

As illustrated in FIG. 2A, LED board 116 may define a substrate upon which LEDs 117 may be removably secured. LEDs 117 are electrically connected to LED board 116, which is attached to a power source (not shown) and may further include power distribution circuitry (not shown). Driver circuitry (not shown) may be included in LED board 116 for driving LEDs 117. More specifically, signal conditioning circuitry (not shown) may be included to optionally provide voltages and currents to LEDs 117. It will be readily appreciated by one of skill in the art that many variations to LED board 116 and its driver circuitry are possible without departing from the scope of the disclosure.

Each of the plurality of LEDs 117 of light pod 100 may vary in make or type. Examples of LED 117 type may include organic light-emitting diodes (OLEDs), polymer light-emitting diodes (PLEDs), and the like. In addition, LEDs 117 may have various wattages, such as but not limited to 1 watt, 3 watt, 5 watt, and future larger size wattages. Further, LEDs 117 may emit any type of light spectrum available or known in the art, such as but not limited to visible, ultraviolet, or infrared.

Regarding the visible light spectrum, LEDs 117 may be multi-color LEDs or any of a variety of colors available or known in the art. A combination of various colored bright white LED may be used for specific general illumination purposes. Colored LEDs may be used for various applications such as red, green and blue LEDs, as well as additional night vision colors known as NVIS Green for various military applications. Accordingly, many combinations may be used to produce white light, or a plurality of white LEDs may be employed to produce the same effect. It can be appreciated that many arrangements of the above described light spectra or colors may be used alone or in combination within light pod 100 without departing from the scope of the disclosure.

FIG. 2A illustrates an exemplary embodiment of light structure 115. Regarding the placement and spatial distribution of LEDs 117 on LED board 116, LEDs 117 may be evenly or symmetrically arranged on LED board 116. Further, LEDs 117 may be arranged in any of a multitude of patterns, based on the desired luminescence output, drive circuit design, or other constraints. The placement of LEDs 117 may depend on the shape of LED board 116. For example, if the LED board is triangular or in a donut-type shape, the LEDs may be placed to cover a surface area thereof. The placement pattern of LEDs 117 may also be independent of the shape of LED board 116.

Further, LEDs 117 may be spatially distributed evenly across LED board 116, i.e., having substantially the same distance between each LED 117. LEDs 117 may also be unevenly distributed, such that one or more LEDs 117 are more closely placed than others. One skilled in the art will appreciate that variations to the placement and spatial distribution of LEDs are possible and within the scope of the disclosure.

Figure 2B:
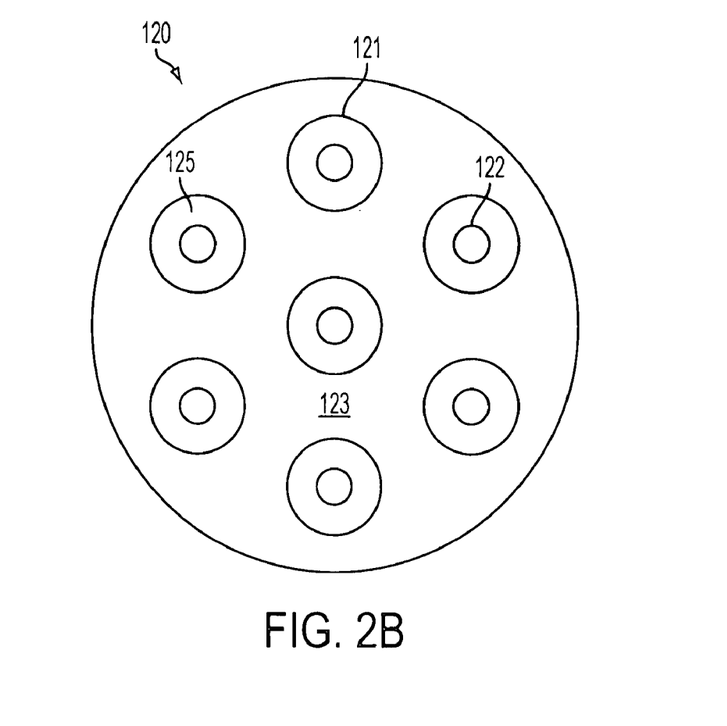
FIG. 2B illustrates an top view of an exemplary reflective optical plate according to the disclosure.

As illustrated in FIGS. 2A and 2B, light structure 115 further includes a reflective optical plate 120 for dissipating and/or bending the light produced by LEDs 117. Reflective optical plate 120 includes a plurality of optical recesses 125, each having an upper aperture 121 and a lower aperture 122. A face plate 123 serves to integrally connect plurality of optical recesses 125 and in general may define the shape of reflective optical plate 120. Similar to LED board 116, reflective optical plate 120 may be made into various shapes and sizes to accommodate design restraints or requirements, such as the desirable intensity or angle of the luminescence produced by light pod 100.

Reflective optical plate 120 may be made from a metallized polymeric material, such as a plastic infused with aluminum, or another material having high reflectivity characteristics. The metallized plastic may have high reflective properties, substantially 99% reflectivity or greater. One of skill in the art would appreciate that any type of reflective material may be employed within the scope of the disclosure, depending on design constraints such as weight, cost, and ease of manufacture. Further, a material that is resilient, inexpensive, or durable may also be desirable for the manufacturing of reflective optical plate 120. For example, aluminum or another suitable metal may be milled to create a desired shape. The use of a metal, or metal-like material may be desirable if light pod 100 were to be used in harsh environments.

Reflective optical plate 120 may be custom designed to match whatever pattern or layout LEDs 117 are placed in. More specifically, as seen in FIG. 2B, optical recesses 125 may be configured in a pattern that mimics the pattern created by LEDs 117 on LED board 116. As a result, each LED 117 on LED board 116 is matched with an optical recess 125. Further, reflective optical plate 120 may be made in a size or shape that would enable it to be retrofitted to existing LED or other lighting fixtures.

FIG. 2A illustrates how reflective optical plate 120 may be aligned and fitted with LED board 116 and LEDs 117. During assembly LEDs 117 may be inserted into lower apertures 122 of reflective optical plate 120. Reflective optical plate 120 may then be placed upon LED board 116. Upper apertures 121 remain open to allow the light emitted from the LEDs to transmit outwardly, and eventually through diffuser cap 110, or other similar cover device.

Diffuser cap 110 may be placed a predetermined distance from reflective optical plate 120 in order to create the appearance of a single light source, thus accommodating desirable aesthetic preferences. Diffuser cap 110 may be manufactured from any translucent material, such as a molded polymer or the like. The predetermined distance may be lessened if the material chosen has a lower translucence. However, this may result in a less overall luminescence emitted from the light pod 100. It will be appreciated by one of skill in the art that various materials having varying translucence may be chosen based on design requirements without departing from the scope of the disclosure Reflective optical plate 120 may be removably fixed to LED board 116 by coupling an exemplary upper fastener 128 with an exemplary lower fastener 129. Reflective optical plate 120 may also be adhered (glue, epoxy, etc.) or otherwise affixed to LED board 116, so long as the coupling of the two pieces secures them to one another such that when LEDs are turned on, reflective optical plate 120 may serve to properly diffuse or dissipate the emitted light. It will be appreciated by one of skill in the art that various methods and forms of fastening may be employed to connect reflective optical plate 120 to LED board 116 without departing from the scope of the disclosure.

Figure 3A:
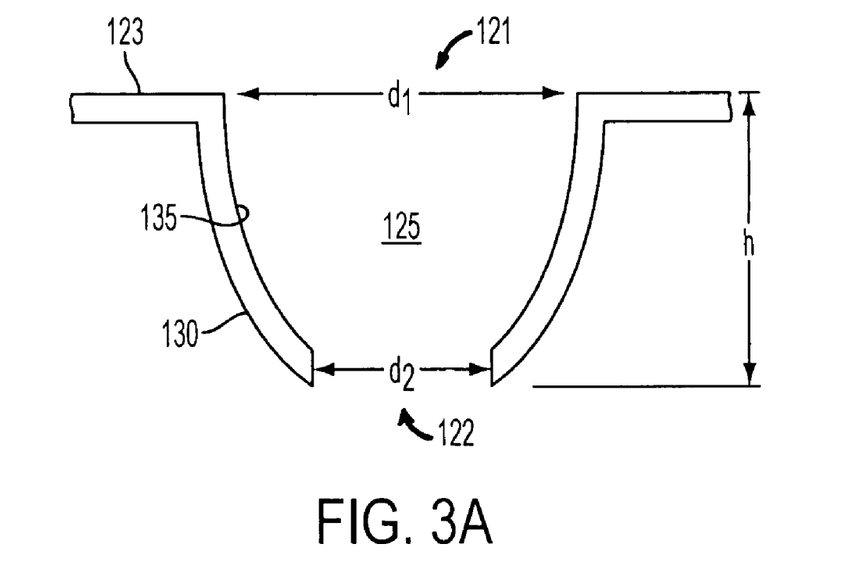
FIG. 3A illustrates a cross-sectional view of an exemplary optical recess.

FIG. 3A illustrates a cross-sectional view of an exemplary optical recess 125. Optical recess 125 includes a sidewall 130 having a predetermined thickness, and an inner concave surface 135 that is oriented at a predetermined angle. Inner concave surface 135 may have a spherical shape, a parabolic shape, or some other curved shape. Further, optical recess 125 may also have a non-curvilinear shape, such as a conical, cylindrical, rectangular, or any other linearly shaped inner wall. Where the inner concave wall is spherical, it may be designed having a predetermined radius of curvature.

Further, as illustrated in FIG. 3A, upper aperture 121 defines a first diameter $d_1$, and lower aperture 122 defines a second diameter $d_2$. The height of optical recess 125 is referred to by h. One having skill in the art may readily appreciate that the optical recesses 125 may vary in size and shape within the same reflective optical plate 120, and need not be designed to be uniform throughout, in order to satisfy a particular design requirement.

Figure 3B:
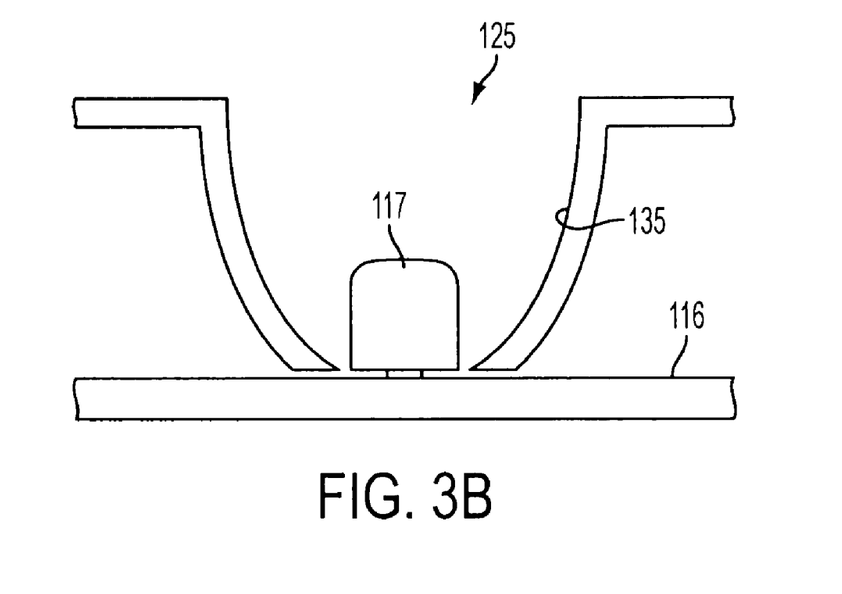
FIG. 3B illustrates a cross-sectional view of an exemplary optical recess having and LED fitted therein.

FIG. 3B illustrates the cross-sectional view of an exemplary optical recess 125, as seen in FIG. 3A, with the addition of LED 117 inserted into lower aperture 122. As power is supplied to a semiconductor (not shown) in LED 117, light is emitted therefrom, some of which is then reflected off of inner concave surface 135. As the emitted light reflects off inner concave surface 135, it will thus be transformed into a predetermined optical pattern or beam that depends on the size and shape of optical recess 125.

The manner in which the light is reflected or dissipated in optical recess 125 depends on the chosen dimensional properties thereof, such as the ratio between the lengths of $d_1$, $d_2$, and h. The value of the predetermined angle or radius of curvature of inner concave surface 135 will also influence the resulting optical pattern. Optical recess may, for example, have an upper diameter ($d_1$) in the range of 12 to 15 mm, and a height (h) in the range of 12 to 15 mm, with an inner spherical surface, thus creating a predetermined optical pattern. It will be readily appreciated by those having skill in the art that many combinations of values may be implemented for each of the above dimensions in order to create a predetermined optical pattern or beam, e.g., 30 degree spread, 45 degree spread, flood pattern, etc., for various sizes of LEDs 117 without departing from the scope of the disclosure.

Figure 4:
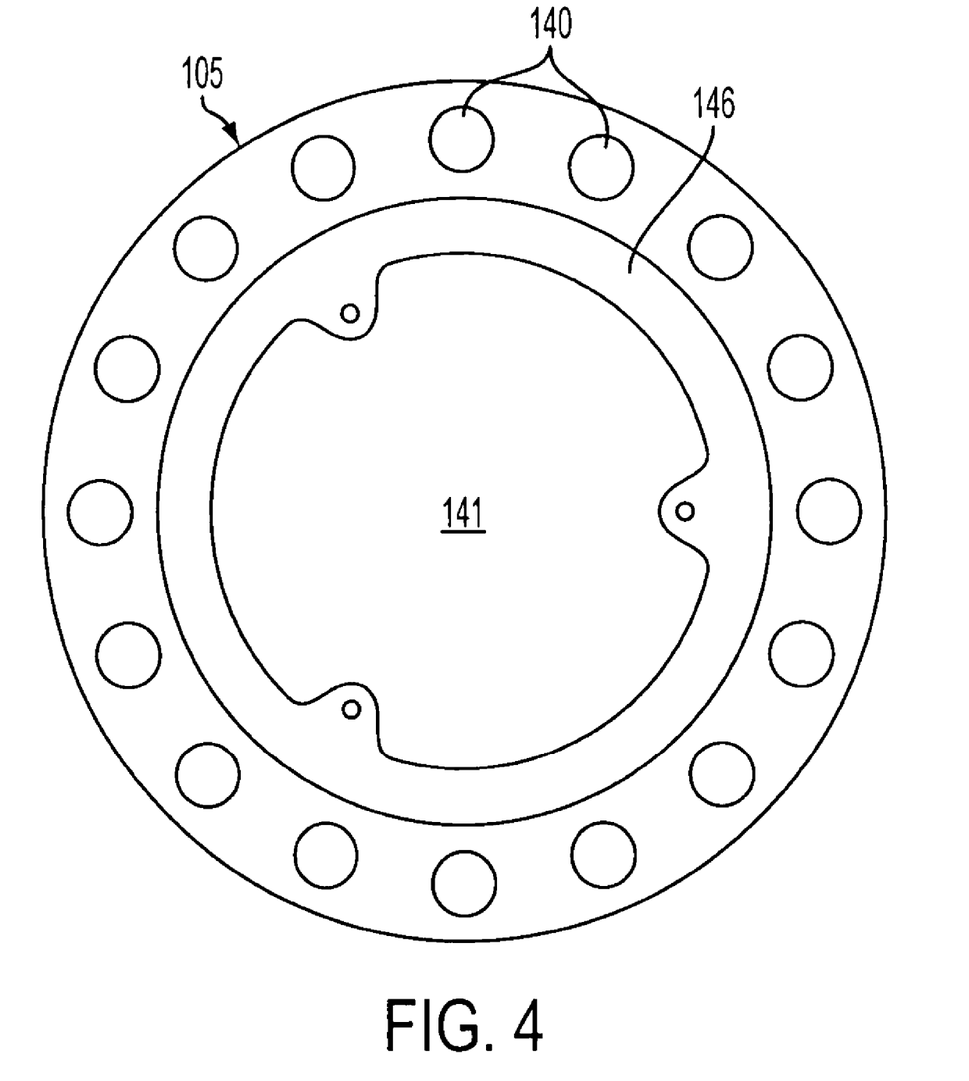
FIG. 4 illustrates a bottom view of an exemplary heat sink housing.

FIG. 4 illustrates a bottom view of heat sink housing 105. Heat sink housing 105 defines an enclosure 141 for receiving components, and includes a plurality of through holes 140 that are disposed about a perimeter of heat sink housing 105. Through holes 140 may extend to a top edge (shown in FIGS. 1A and 1B) of heat sink housing 105, thus increasing the surface to volume ratio of heat sink housing 105 for heat dissipation purposes. Through holes 140 may vary in the cross sectional shape, e.g. rectangular, triangular, polygonal, etc., so long heat sink housing 105 provides a thermally conductive path for heat to escape from heat sink housing 105. Through holes 140 may be milled or integrally formed via a molding process.

Heat sink housing 105 may be made of aluminum, or any thermally conductive material capable of dissipating heat created by LED board 116. An optional mounting structure 146 disposed inside heat sink housing 105 is also shown in FIG. 4, and may be employed for mounting light source 115 and any additional components of light pod 100. Further, heat sink housing 105 may be waterproof, shockproof, and be able to withstand vibration. It will be readily appreciated by one of skill in the art that heat sink housing 105 may be manufactured in any desirable shape without departing from scope and spirit of the disclosure, provided that its surface to volume ratio is adequate to sufficiently dissipate heat.

Figure 5A:
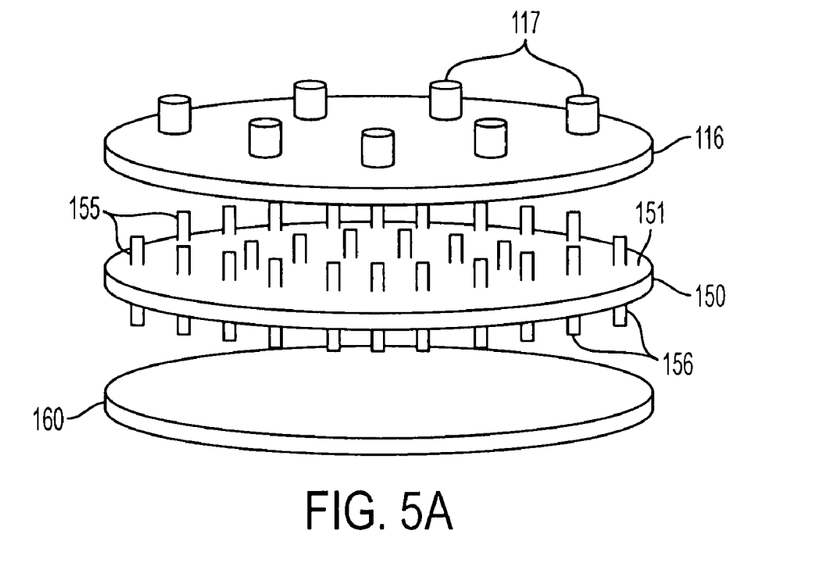
FIG. 5A illustrates an exploded view of an exemplary heat dissipation structure.

FIG. 5A illustrates an exemplary heat extraction plate 150, which is another component of the heat dissipation structure. Heat extraction plate 150 includes a plurality of upper 155 and lower 156 thermally conductive posts, that may extend from heat extraction plate 150 in a substantially perpendicular direction with respect to plate surface 151. Upper and lower thermally conductive posts 155 and 156 may be arranged in various patterns that serve to better dissipate heat from LED board 116. More specifically, heat extraction plate 150 may be designed such that thermally conductive posts 115 may be placed to interface directly with particular hot spots on LED board 116. One of skill in the art may appreciate that the placement and resulting pattern of upper and lower thermally conductive posts 155 and 156 may vary depending on the arrangement of LEDs 117.

Heat extraction plate 150 and upper and lower thermally conductive posts 155 and 156 may be made of a combination of materials, wherein one material has a lower thermal expansion and another material has a higher thermal conductivity. More specifically, a heat transfer component that has a low coefficient of thermal expansion may mitigate any expansion as the component is heated, while also providing effective heat dissipation characteristics. Further, heat extraction plate 150 and upper and lower thermally conductive posts 155 and 156 may be made in a size or shape that would enable them to be retrofitted to existing LED or other lighting fixtures.

In one embodiment, the heat extraction plate 150, and upper and lower thermally conductive posts 155 and 156 may have a core that is made of a material such as graphite, or another organic or composite material that has a low thermal expansion coefficient. In order to achieve greater heat dissipation characteristics the graphite material, which generally has a low thermal conductivity, may be coated with aluminum, which has a high thermal conductivity. Another material that has a high thermal conductivity, such as alloys or the like, may also be suitable for the coating. Further, it will be appreciated to one of skill in the art that metals, composites, or other material having the above desirable properties and characteristics may also be utilized without departing from the scope of the disclosure.

Figure 6A:
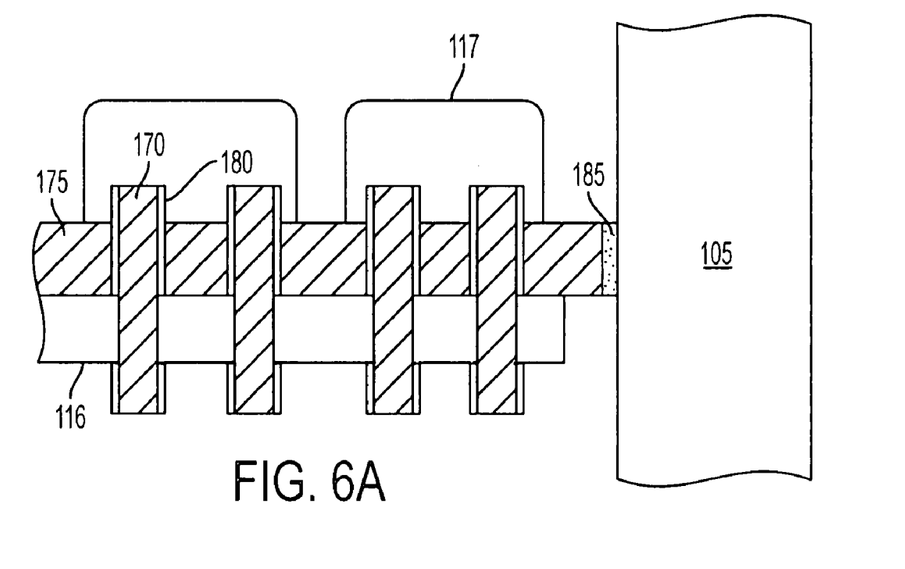
FIG. 6A illustrates a cross-sectional view of an another exemplary heat dissipation structure.
Figure 6B:
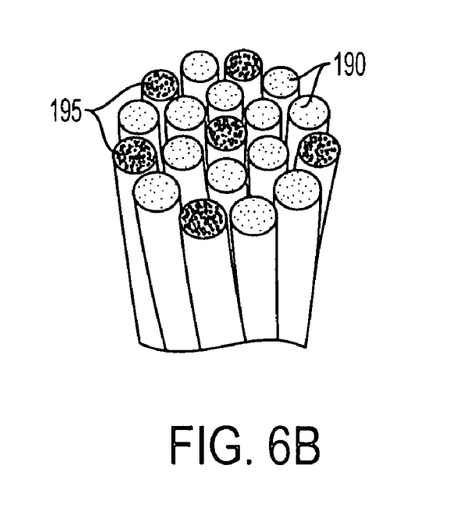
FIG. 6B illustrates a perspective view of and exemplary bundle of strands of aluminum and carbon for fabrication of parts of the heat dissipation structure.

FIG. 6B illustrates an alternate construction for the material of the heat dissipation structure. Heat extraction plate 150, and upper and lower thermally conductive posts 155 and 156 may be made from cylindrical strands of aluminum 190 and carbon 195 that are bundled together. Further, heat extraction plate 150 may be made of a graphite core and an aluminum coating, while the upper and lower thermally conductive posts 155 and 156 may be made from the bundled strands of aluminum and carbon. It will be appreciated to one having skill in the art that various combinations of the use of these materials for the various heat dissipation components may be employed without departing from the scope of the disclosure.

Figure 5B:
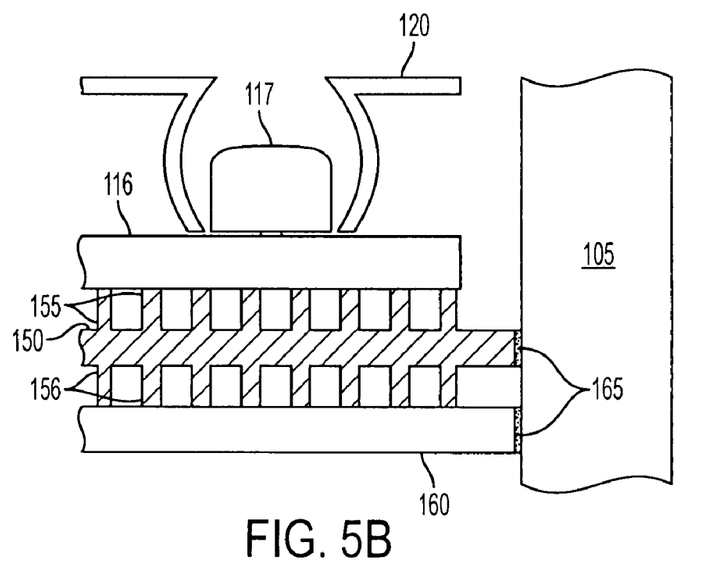
FIG. 5B illustrates a cross sectional view of the exemplary heat dissipation structure of FIG. 5A and reflective optical plate.

FIG. 5B illustrates a side view of the heat extraction plate 150 and upper and lower thermally conductive posts 155 and 156 in contact with LED board 116, with LEDs 117 fitted to reflective optical plate 120. As LEDs 117 are powered, LED board 116 may begin to heat up. Upper thermally conductive posts 155 may be in direct thermal contact with a lower surface of LED board 116 for transferring the heat created through operation of LEDs 117. A first thermally conductive heat path is thus created as the heat passes from upper thermally conductive posts 155 through extraction plate 150 and then laterally into heat sink housing 105. The heat is then transferred, via radiation and convection, from heat sink housing 105 into the surrounding environment, thus acting to regulate the temperature of light pod 100.

As illustrated in FIGS. 5A and 5B, a heat dissipation plate 160 may also be provided at a lower side of heat extraction plate 150 to aid in removal of the heat produced at LED board 116. Heat dissipation plate 160 contacts lower thermally conductive posts 156 to create a second thermally conductive path, leading heat away from LED's 117 and LED board 116. A portion of the heat that is transferred from LED board 116 to heat extraction plate 150 is drawn into lower thermally conductive posts 156 and from there is conducted through heat dissipation plate 160. The heat is then dissipated outwardly from heat dissipation plate 160 into the surrounding environment, further acting to regulate the temperature of light pod 100.

As illustrated in FIG. 5B, high thermally conductive grease 165 may be disposed between heat extraction plate 150 and heat sink housing 105, and also between heat dissipation plate 160 and heat sink housing 105. High thermally conductive grease 165 acts to enhance the thermally conductive properties of the system. One of skill in the art will appreciate that adhesives and sealants, or the like, having properties similar to the high conductive grease 165 may be utilized to enhance the heat dissipation structure without departing from the scope of the disclosure.

FIG. 6A illustrates an alternative heat dissipation structure including a plurality of conductive pins 170 and heat extraction plate 175. LEDs 117, LED board 116, and heat sink housing 105 are also included and may be similar to those described above. Further, it will be appreciated that this alternative heat dissipation structure may be installed into light pod 100, or any relevant light fixture, in a manner similar to that disclosed above.

Heat extraction plate 175 is disposed between LEDs 117 and LED board 116 in order to effectively remove or dissipate heat produced in light pod 100. As illustrated in FIG. 6B, conductive pins 170 may be made of bundled aluminum 190 and carbon 195 strands surrounded by a carbon or structured laminate sleeve 180. Conductive pins 170 are configured to transmit electricity and heat. More specifically, conductive pins 170 may be electrically connected with LED board 116 to power LEDs 117. Conductive pins 170 may also thermally communicate with heat extraction plate 175.

Heat extraction plate 175 may also be made of substantially the same material as conductive pins 170, i.e. bundled aluminum 190 and carbon 195 strands. As illustrated in FIG. 6A, sleeve 180 surrounds at least a portion of conductive pins 170 and substantially mitigates any electrical shorts or potential circuit failure. Accordingly, as LEDs 117 are powered and heat is produced, a thermally conductive path is created, and heat is dissipated away from LEDs 117 and LED board 116 through conductive pins 170 and then heat extraction plate 175. The dissipated heat, following the thermally conductive path, is then transferred to heat sink housing 105 and released into the surrounding environment, thus acting to regulate the temperature of light pod 100.

A high thermally conductive grease 185 may be disposed between heat extraction plate 175 and heat sink housing 105 to enhance the thermally conductive properties of the system. One of skill in the art will appreciate that adhesives, and sealants or the like having properties similar to the high thermally conductive grease 185 may be utilized to enhance the heat dissipation structure without departing from the scope of the disclosure.

Figure 7A:
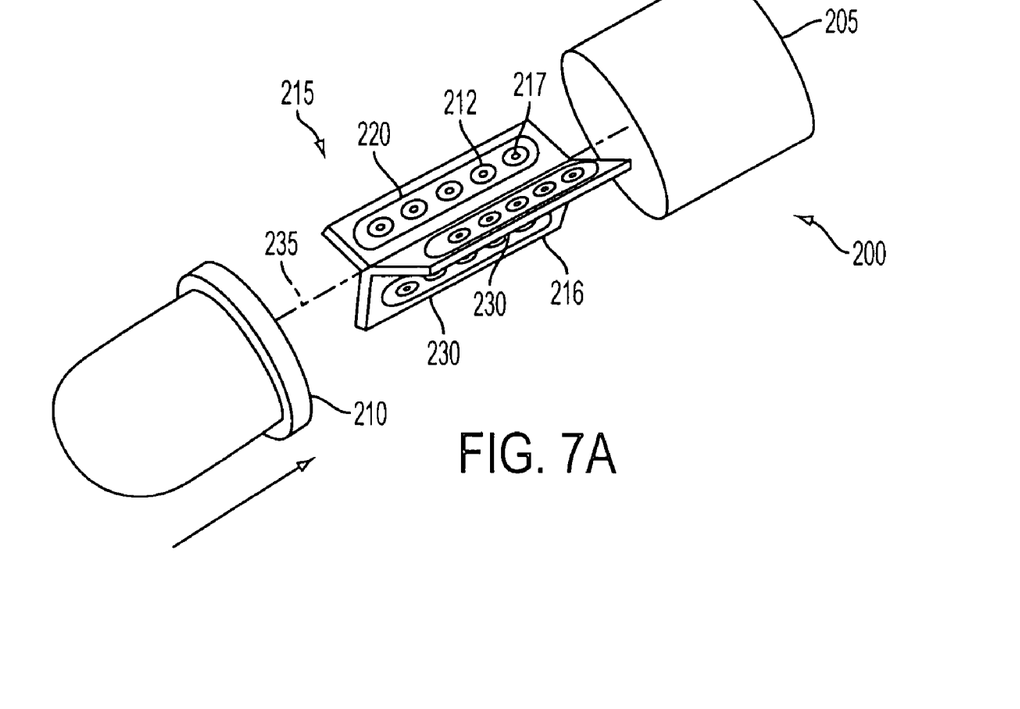
FIG. 7A illustrates an exploded view of another exemplary embodiment of the light pod according to the disclosure.
Figure 7B:
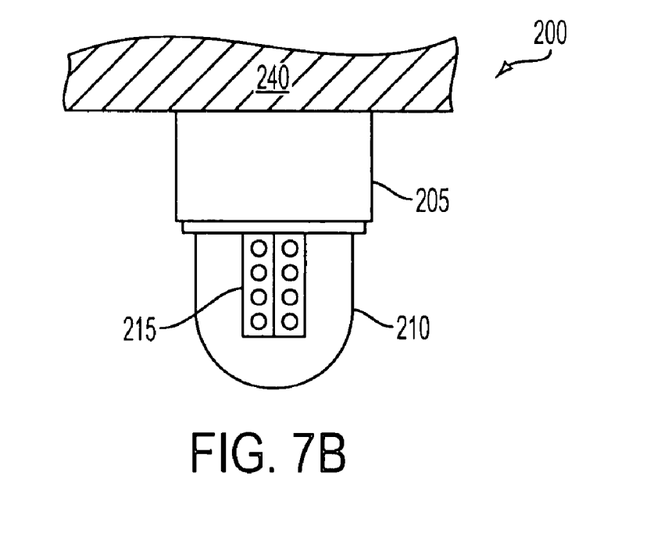
FIG. 7B illustrates a side view of the embodiment of FIG. 6.

FIGS. 7A and 7B illustrate an alternative exemplary light pod 200 of the disclosed invention. Light pod 200 includes a light source 215 having LED board 216. LED board 216 may be coupled to a reflective optical plate 220, similar to that described above. Reflective optical plate 220 may have a linear configuration with a predetermined plurality of upper apertures 212, and LEDs 217 set therein. A housing 205 is provided for protecting and mounting lighting structure 215 to a ceiling, wall, or other surface 240. Housing 205 is coupled to diffuser cap 210, as illustrated in the assembled form of FIG. 7B. Housing 205 may be similar to that described in the above disclosure wherein it acts as a heat sink, providing heat dissipation.

Light source 215 may have two or more fins 230 extending outwardly from a central axis 235, in order to achieve a desired luminescence. Three fins 230 are illustrated in FIG. 7A for exemplary purposes, although more or fewer are possible depending on the desired luminescence of light pods 200 and the amount of heat to be dissipated by housing 205. Each fin 230 may have duplicate LED boards 216 and reflective optical plates 220 with LEDs 217. It will be appreciated by one of skill in the art that the light source and its associated optical components may vary in size and shape in order to accommodate design requirements without departing from the scope of the disclosure.

Figure 8:
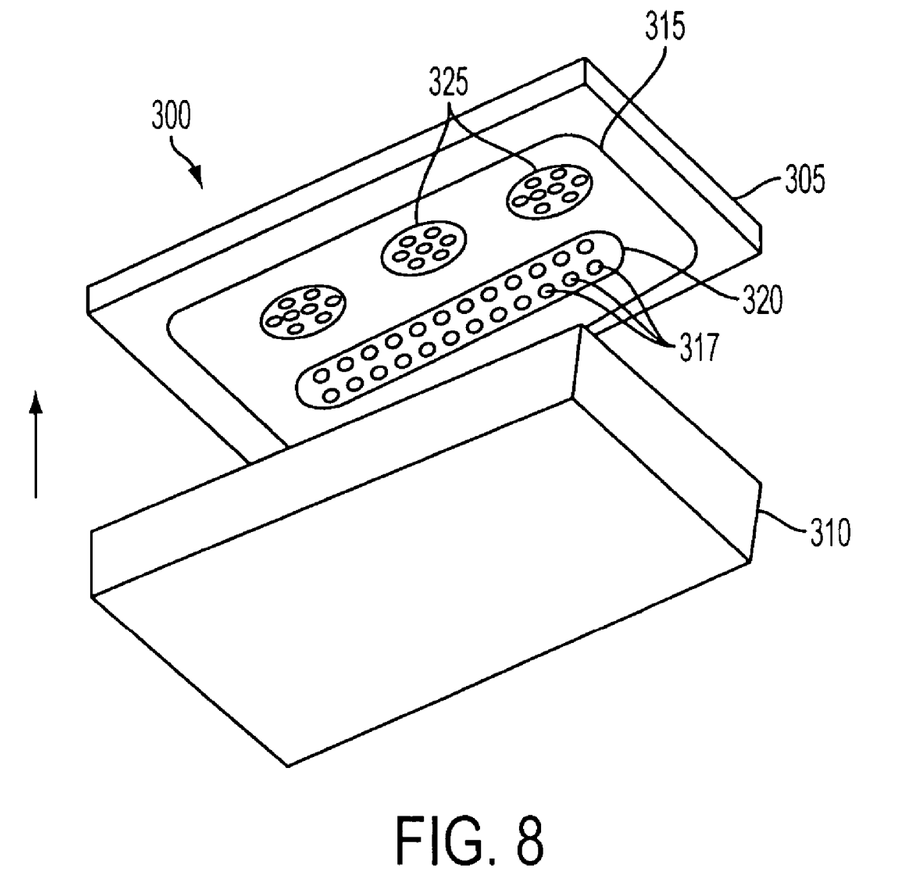
FIG. 8 illustrates an exploded view of yet another exemplary embodiment of the light pod according to the disclosure.

FIG. 8 illustrates yet another alternative light pod 300 of the disclosed invention. Light pod 300 may generally be square or rectangular in shape, and include diffuser cap 310 that diffuses light from a plurality of LEDs. Base housing 305 may be mounted to a wall or other surface and has a substrate 315 mounted thereon. Substrate 315 may be an LED board or other circuit board as described above. Reflective optical plates 320 and 325, with associated LEDs, may be fixed to substrate 315 to provide a light source.

Reflective optical 320 and 325 plates have a circular shape 325 or a linear shape 320, depending on design requirements or restraints. Both circular 325 and linear 320 shapes are illustrated in FIG. 7 for exemplary purposes. One of ordinary skill may appreciate that light pod 300 may use either, both, or other shapes according to design requirements.

An exemplary process for fabricating reflective optical plates 120, 220, 320 and 325 is described below. Despite differences in size or shape of the reflective optical plates, each may be made by substantially the same process. First a mold is created based on certain design specifications that dictate the desired optical pattern of the light emitted from LEDs 117. The mold may be designed based on predetermined dimensions of the optic ($d_1$, $d_2$, h, the shape/angle of inner concave surface 135, or the value of the predetermined radius of curvature of inner concave surface 135) that will bend the emitted light in the desired fashion. Further, the mold may be designed and fabricated by various processes, such as computer numerical control (CNC) milling techniques.

Once a mold is made, metallized plastic is heated to a liquid state and poured, injection molded, or otherwise introduced into the mold to create a reflective optic plate of having the predetermined dimensions. After the metallized plastic is cooled, it is removed from the mold. The reflective optic plate may be made in varying shapes and sizes, circular, linear, triangular, etc. to fit a particular design requirement. Reflective optic plates may in this manner be manufactured in mass quantities, thus increasing production and reducing costs.

It will be apparent to those skilled in the art that various modifications and variations can be made in the invention without departing from the spirit or scope of the disclosure. Thus, it is intended that the present disclosure cover the modifications and variations of this invention provided they come within the scope of the appended claims and their equivalents.

What is claimed is:

1. A light fixture, comprising:
    a housing;
    a plurality of light sources disposed on an electrical board;
    a reflective optical plate disposed on the electrical board, the reflective optical plate having a plurality of recesses, wherein the plurality of recesses correspond to each of the plurality of light sources;
    a heat dissipation component comprising a heat extraction plate having a first plurality of thermally conductive posts extending from an upper surface of the heat extraction plate, and a second plurality of thermally conductive posts extending from a lower surface, wherein the first plurality of thermally conductive posts are in contact with a portion of the electrical board;
    a heat dissipation plate disposed below the heat extraction plate and in contact with the second plurality of thermally conductive posts; and
    a heat sink housing that communicates with the heat dissipation component.

2. The light fixture of claim 1, wherein the plurality of light sources are light emitting diodes.

3. The light fixture of claim 1, wherein the reflective optical plate is made of a molded metallized polymer.

4. The light fixture of claim 1, wherein the plurality of recesses comprises each recess having an upper aperture and a lower aperture, and an inner wall, configured to dissipate light produced by the plurality of light sources into a predetermined light pattern.

5. The light fixture of claim 4, wherein the plurality of light sources are received into the lower aperture.

6. The light fixture of claim 1, wherein each of the plurality of recesses comprises an inner concave wall having a predetermined radius of curvature.

7. The light fixture of claim 1, wherein the heat sink housing includes a plurality of through-holes disposed about the perimeter.

8. The light fixture of claim 1, wherein the plurality of posts are fabricated from a plurality of aluminum and carbon strands.

9. The light fixture of claim 8, wherein the heat extraction plate comprises:
    a core made of a material that is substantially resistant to thermal expansion; and
    a coating made of a material that is substantially conducive to thermal conductivity.

10. The light fixture of claim 9, wherein the core material is graphite and the coating material is aluminum.

* * * * *